United States Patent
Holland et al.

(10) Patent No.: US 10,978,027 B2
(45) Date of Patent: *Apr. 13, 2021

(54) ELECTRONIC DISPLAY PARTIAL IMAGE FRAME UPDATE SYSTEMS AND METHODS

(71) Applicant: Apple Inc., Cupertino, CA (US)

(72) Inventors: Peter F. Holland, Los Gatos, CA (US); Mahesh B. Chappalli, San Jose, CA (US); Assaf Menachem, Yokneam Illit (IL)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/828,824

(22) Filed: Mar. 24, 2020

(65) Prior Publication Data

US 2020/0227010 A1  Jul. 16, 2020

Related U.S. Application Data

(63) Continuation of application No. 15/969,539, filed on May 2, 2018, now Pat. No. 10,636,392.

(51) Int. Cl.
*G09G 5/393* (2006.01)
*G09G 5/10* (2006.01)
*G09G 5/395* (2006.01)

(52) U.S. Cl.
CPC .............. *G09G 5/393* (2013.01); *G09G 5/10* (2013.01); *G09G 5/395* (2013.01);
(Continued)

(58) Field of Classification Search
CPC .......... G09G 5/393; G09G 5/10; G09G 5/395; G09G 2310/04; G09G 2320/0626;
(Continued)

(56) References Cited

U.S. PATENT DOCUMENTS 7,593,603 B1 * 9/2009 Wilensky ................. G06T 5/00
358/1.2
9,177,534 B2  11/2015 Jeganathan et al.
(Continued)

OTHER PUBLICATIONS

Texas Instruments: "OMAP35x Applications Processor Technical Reference Manual", Dec. 31, 2012, XP055601641.
(Continued)

*Primary Examiner* — Phuc N Doan
(74) *Attorney, Agent, or Firm* — Fletcher Yoder, P.C.

(57) ABSTRACT

An electronic device may include a display panel and an image data source designed to determine a differing region in the image frame by comparing source image data and image data corresponding with a previous image frame. The electronic device may also include a display pipeline between the image data source and the display panel. The display pipeline may include image processing circuitry to convert image data from a source space to a display space and image processing circuitry to spatially process the image data. The display pipeline may determine a crop region by converting the differing region to the display space and determine a partial frame region, based on the image data to be spatially processed, by the image processing circuitry. The display pipeline may also determine and retrieve a fetch region smaller than the image frame by converting the partial frame region to the source space.

20 Claims, 9 Drawing Sheets

(52) U.S. Cl.
CPC . *G09G 2310/04* (2013.01); *G09G 2320/0626* (2013.01); *G09G 2320/103* (2013.01); *G09G 2330/021* (2013.01); *G09G 2340/0407* (2013.01); *G09G 2340/0492* (2013.01); *G09G 2340/16* (2013.01); *G09G 2350/00* (2013.01); *G09G 2360/127* (2013.01)

(58) Field of Classification Search
CPC ....... G09G 2320/103; G09G 2330/021; G09G 2340/0407; G09G 2340/0492; G09G 2340/16; G09G 2350/00; G09G 2360/127
See application file for complete search history.

(56) References Cited

U.S. PATENT DOCUMENTS

| | | |
|---|---|---|
| 9,335,964 B2 | 5/2016 | Khatod et al. |
| 2010/0321402 A1* | 12/2010 | Han .................. G09G 3/00 345/619 |
| 2011/0273470 A1* | 11/2011 | Ohba ............. G06F 3/0481 345/619 |
| 2014/0184611 A1 | 7/2014 | Wyatt et al. |
| 2014/0218378 A1 | 8/2014 | Roh et al. |
| 2015/0002537 A1* | 1/2015 | Samvik ............. G06T 11/60 345/620 |
| 2016/0329033 A1* | 11/2016 | Woo ................. G09G 5/393 |
| 2017/0018247 A1 | 1/2017 | Frederiksen et al. |
| 2017/0109859 A1* | 4/2017 | Singh ............... G09G 3/20 |
| 2017/0110085 A1* | 4/2017 | Yang ................. G06T 1/60 |

OTHER PUBLICATIONS

International Search Report and Written Opinion for PCT Application No. PCT/US2019/029448 dated Jul. 11, 2019; 15 pgs.

* cited by examiner

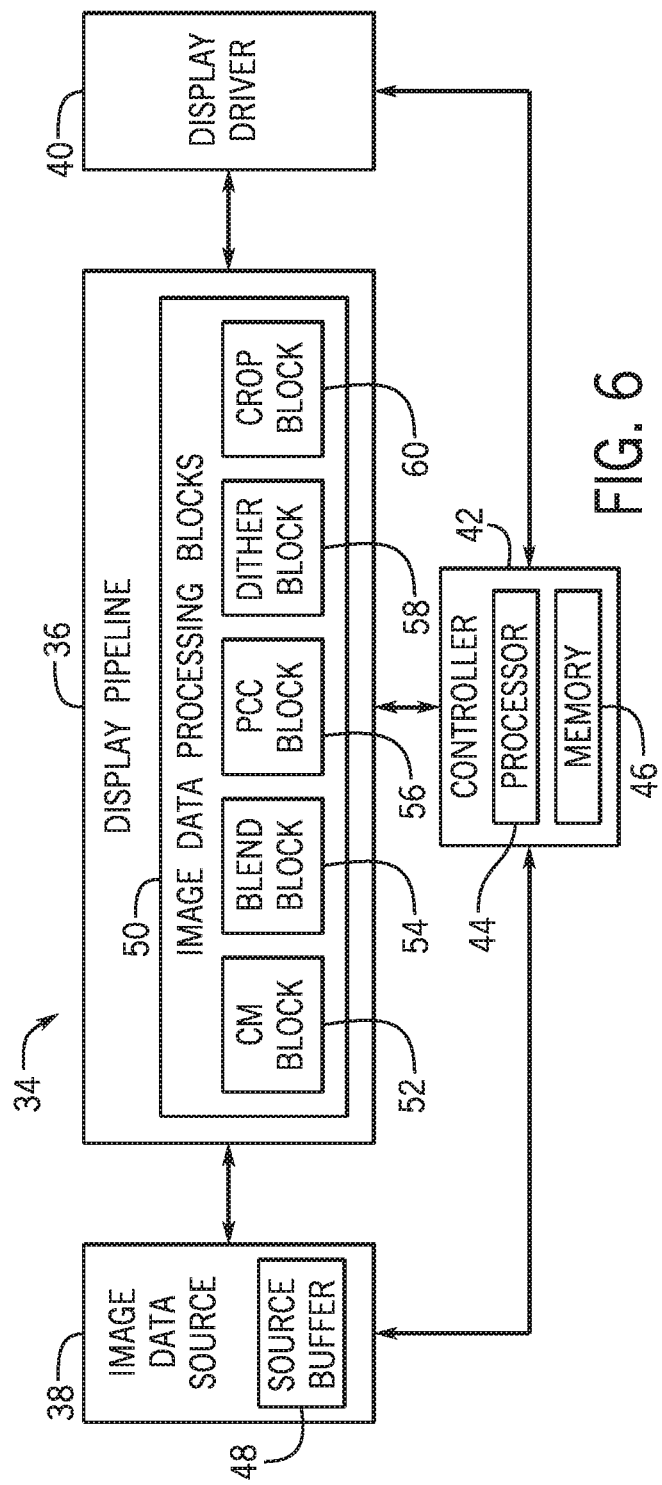
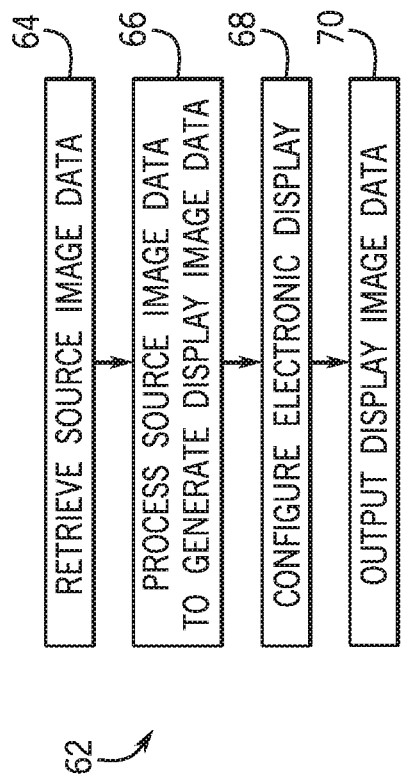

ELECTRONIC DISPLAY PARTIAL IMAGE FRAME UPDATE SYSTEMS AND METHODS

CROSS REFERENCE TO RELATED APPLICATIONS

This application is a Continuation of and claims priority to U.S. patent application Ser. No. 15/969,539, filed May 2, 2018, which is incorporated herein by reference in its entirety.

BACKGROUND

The present disclosure relates generally to electronic displays and, more particularly, to refreshing (e.g., updating) images displayed on an electronic display.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use one or more electronic displays to present visual representations of information as text, still images, and/or video by displaying one or more images (e.g., image frames). For example, such electronic devices may include computers, mobile phones, portable media devices, tablets, televisions, virtual-reality headsets, and vehicle dashboards, among many others. In any case, to display an image, an electronic display may control light emission (e.g., luminance) of its display pixels based at least in part on corresponding image data, for example, retrieved (e.g., fetched) from an image data source, such as external memory (e.g., source buffer). To facilitate improving perceived image quality, in some instances, image data may be processed before being used to display a corresponding image. Additionally, to control light emission, the electronic display may adjust magnitude of electrical power (e.g., voltage and/or current) supplied to its display pixels.

As such, writing an image, retrieving corresponding image data, and processing corresponding image data may consume resources, such as electrical power and/or memory access bandwidth. In fact, resource usage is generally dependent on amount of image data fetched, processed, and, thus, used to update (e.g., write or refresh) a corresponding image. For example, increasing the amount of image data received and processed may increase power consumption, thereby depleting stored electrical energy at a faster rate. Additionally or alternatively, increasing the amount of retrieved image data may increase memory access bandwidth utilization, thereby reducing bandwidth available for other processes.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

It may become desirable to change the current frame shown on an electronic display. As such, subsequent image data may be sent through a display pipeline of an electronic device to update the electronic display for viewing. In some embodiments, a partial frame update may be sent to the electronic display to change just a portion of the display pixels. Significant power savings may be achieved by updating (e.g., refreshing) only display pixels that have potentially changed from the prior frame.

The electronic device may determine if a partial frame update is to be utilized by examining a number of factors. For example, the electronic device may determine a differing region of image data that has changed from the previous frame. In one embodiment, if the amount of changed image data is greater than a threshold, a partial frame update may be precluded. Additionally, if a scene change is detected, it may not be desirable to perform a partial frame update. Furthermore, environmental factors such as an ambient lighting change that causes a change in target light output (e.g., from a backlight) may also be considered when determining whether a partial frame update is desirable.

In some embodiments, multiple frames may be buffered prior to presentation on an electronic display, for example, in an arbitrary presentation time scenario, frame scheduling of multiple frames may be employed. As such, partial frame registers may keep track of individual frames and their desirability to undergo a partial frame update. In other words, a frame's eligibility for a partial frame update may change during frame scheduling and the partial frame registers may keep track of this eligibility.

To facilitate performing a partial frame update, the differing region may be used to determine other partial regions such as a crop region, a partial processing region, partial frame region, and/or a partial scaling (e.g., fetch) region. Depending on spatial processing done within the display pipeline, more or fewer partial regions may be used. In some embodiments, each of the partial regions may be determined prior to the display pipeline fetching image data. The partial regions of an image may contain the image data used in different segments of the display pipeline. For example, the display pipeline may fetch a partial scaling region of image data from an image data source and process the image data, for example by spatially dithering the image data and/or implementing color management or blending techniques. Additionally, the display pipeline may output the image data within the crop region to a display driver to be shown on the display.

BRIEF DESCRIPTION OF THE DRAWINGS

Various aspects of this disclosure may be better understood upon reading the following detailed description and upon reference to the drawings in which:

FIG. 6 is a block diagram of a display pipeline coupled between an image data source and a display driver included in the electronic device of FIG. 1, in accordance with an embodiment;

FIG. 7 is a flow diagram of a process for operating the display pipeline of FIG. 6, in accordance with an embodiment;

DETAILED DESCRIPTION OF SPECIFIC EMBODIMENTS

Figure 1:
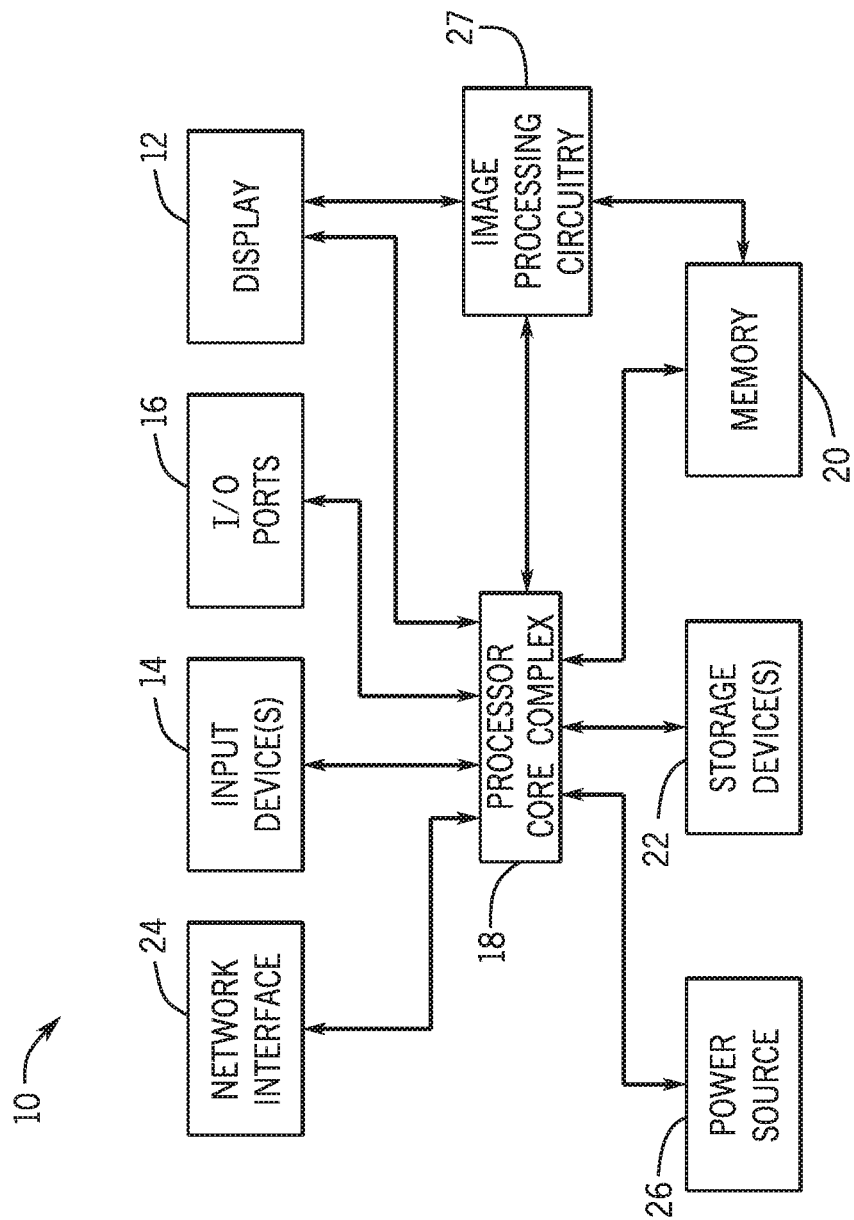
FIG. 1 is a block diagram of an electronic device that includes an electronic display, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Electronic devices often use one or more electronic displays to present visual representations of information such as text, still images, and/or video by displaying one or more images over time. For example, such electronic devices may include computers, mobile phones, portable media devices, tablets, televisions, virtual-reality headsets, and vehicle dashboards, among many others. Images may be sourced from memory, external connections, user input, internal processing outputs, and/or other means. The images may also follow a display pipeline and undergo further image processing between being sourced and being displayed on an electronic display. In other words, the display pipeline may facilitate displaying images on an electronic display, for example, by processing image data to improve perceived viewing when corresponding images are displayed. Such a display pipeline for image processing may be software and/or hardware based.

Multiple different images may be sent to the display of the electronic device over time. A set of image data corresponding to a single image sent in time to the display may be known as a frame. Frames shown on the display may be changed periodically and/or when desired based on computed, externally input, and/or user prompts. A frame rate (e.g., refresh rate) may correspond to the rate at which frames are changed, and may be constant or vary. For example, in an arbitrary presentation time (APT) scenario, the frame rate may vary from frame to frame.

When it is desirable to change the currently displayed frame, subsequent image data may be sent through the display pipeline. In some embodiments, multiple frames may be buffered prior to presentation. However, retrieving and processing image data, as well as updating (e.g., writing or refreshing) a displayed image, generally consumes memory access bandwidth and/or electrical power. To facilitate reducing power consumption and/or other system resources such as memory access and/or processing bandwidth, the display pipeline may generate a partial frame update to update one or more portions of the frame that encompass differences between the current frame and the subsequent frame, for example, without updating the entire frame.

The electronic device may determine if a partial frame update is to be employed by examining a number of factors. For example, the electronic device may determine a differing region of image data that has changed from the previous frame. In one embodiment, if the amount of changed image data is greater than a threshold, a partial frame update may be precluded. Additionally, if a scene change is detected, it may not be desirable to perform a partial frame update. Furthermore, environmental factors such as an ambient lighting change that causes a change in the desired light output (e.g., from a backlight) may also determine if a partial frame update is desirable. Other factors, such as the configuration of the display pipeline, which may be determined based on register values, may also affect the desirability of a partial frame update. Such configuration items of the display pipeline may include the status of, for example, a pixel contrast control (PCC) block, a color management block, a vertical scaler block, a horizontal scaler block, a dither block, and/or the like.

In some embodiments, multiple frames may be buffered prior to presentation. For example, in an arbitrary presentation time scenario, frame scheduling of multiple frames may be employed. As such, partial frame registers may keep track of individual frames and their desirability to undergo a partial frame update. In other words, a frame's eligibility for a partial frame update may change during frame scheduling, and the partial frame registers may keep track of this eligibility.

When a partial frame update is to be accomplished, the determined differing region may be converted from the source space to the display space. This may involve, for example, scaling, rotation, mirroring, and/or flipping of the source image to meet the parameters of the display space. As such, the differing region may be used to determine other partial regions such as a crop region, partial processing region, partial frame region, and/or a partial scaling (e.g., fetch) region. Depending on spatial processing done within the display pipeline, more or fewer partial regions may be used. In some embodiments, each of the partial regions may be determined prior to the display pipeline fetching image data. The partial regions of image data may contain the image data used in different segments (e.g., spatial processing) of the display pipeline. For example, the display pipeline may fetch a partial scaling region of image data from an image data source and process the image data, for example by spatially dithering the image data and/or implementing color management or blending techniques. Additionally, the display pipeline may output the image data within the crop region to a display driver to be shown on the display.

To help illustrate, an electronic device 10 including an electronic display 12 is shown in FIG. 1. As will be described in more detail below, the electronic device 10 may be any suitable electronic device, such as a computer, a mobile phone, a portable media device, a tablet, a television, a virtual-reality headset, a vehicle dashboard, and the like. Thus, it should be noted that FIG. 1 is merely one example of a particular implementation and is intended to illustrate the types of components that may be present in an electronic device 10.

In the depicted embodiment, the electronic device 10 includes the electronic display 12, one or more input devices 14, one or more input/output (I/O) ports 16, a processor core complex 18 having one or more processor(s) or processor cores, local memory 20, a main memory storage device 22, a network interface 24, a power source 26, and image processing circuitry 27. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component. Additionally, the image processing circuitry 27 (e.g., a graphics processing unit) may be included in the processor core complex 18.

As depicted, the processor core complex 18 is operably coupled with local memory 20 and the main memory storage device 22. Thus, the processor core complex 18 may execute instructions stored in local memory 20 and/or the main memory storage device 22 to perform operations, such as generating and/or transmitting image data. As such, the processor core complex 18 may include one or more general purpose microprocessors, one or more application specific integrated circuits (ASICs), one or more field programmable logic arrays (FPGAs), or any combination thereof.

In addition to instructions, the local memory 20 and/or the main memory storage device 22 may store data to be processed by the processor core complex 18. Thus, in some embodiments, the local memory 20 and/or the main memory storage device 22 may include one or more tangible, non-transitory, computer-readable mediums. For example, the local memory 20 may include random access memory (RAM) and the main memory storage device 22 may include read only memory (ROM), rewritable non-volatile memory such as flash memory, hard drives, optical discs, and/or the like.

As depicted, the processor core complex 18 is also operably coupled with the network interface 24. In some embodiments, the network interface 24 may facilitate communicating data with another electronic device and/or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, and/or a wide area network (WAN), such as a 4G or Long-Term Evolution (LTE) cellular network.

Additionally, as depicted, the processor core complex 18 is operably coupled to the power source 26. In some embodiments, the power source 26 may provide electrical power to one or more components in the electronic device 10, such as the processor core complex 18 and/or the electronic display 12. Thus, the power source 26 may include any suitable source of energy, such as a rechargeable lithium polymer (Li-poly) battery and/or an alternating current (AC) power converter.

Furthermore, as depicted, the processor core complex 18 is operably coupled with the one or more I/O ports 16. In some embodiments, I/O ports 16 may enable the electronic device 10 to interface with other electronic devices. For example, when a portable storage device is connected, the I/O port 16 may enable the processor core complex 18 to communicate data with the portable storage device.

As depicted, the electronic device 10 is also operably coupled with the one or more input devices 14. In some embodiments, an input device 14 may facilitate user interaction with the electronic device 10, for example, by receiving user inputs. Thus, an input device 14 may include a button, a keyboard, a mouse, a trackpad, and/or the like. Additionally, in some embodiments, an input device 14 may include touch-sensing components in the electronic display 12. In such embodiments, the touch sensing components may receive user inputs by detecting occurrence and/or position of an object touching the surface of the electronic display 12.

In addition to enabling user inputs, the electronic display 12 may include a display panel with a display driver and one or more display pixels. In some embodiments, the display pixels may be arranged in an array (e.g., grid). Additionally, in some embodiments, the display driver may be coupled to each row of display pixels via a corresponding scan (e.g., gate) line and to each column of display pixels via a corresponding data line.

In any case, as described above, the electronic display 12 may control light emission from the display pixels to present visual representations of information, such as a graphical user interface (GUI) of an operating system, an application interface, a still image, or video content, by displaying frames based at least in part on corresponding image data. As depicted, the electronic display 12 is operably coupled to the processor core complex 18 and the image processing circuitry 27. In this manner, the electronic display 12 may display frames based at least in part on image data generated by the processor core complex 18, the image processing circuitry 27. Additionally or alternatively, the electronic display 12 may display frames based at least in part on image data received via the network interface 24, an input device, and/or an I/O port 16.

Figure 2:
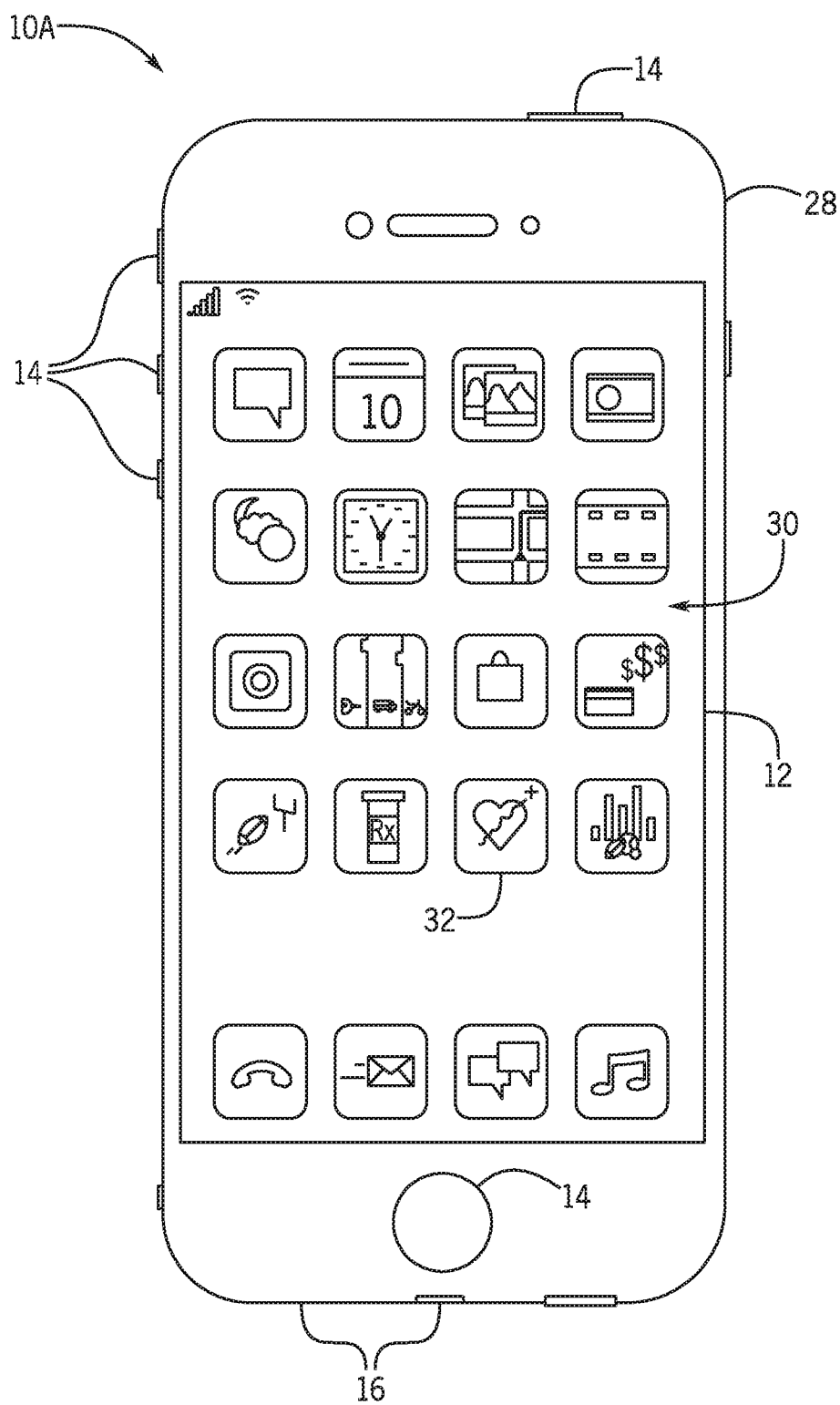
FIG. 2 is an example of the electronic device of FIG. 1, in accordance with an embodiment.

As described above, the electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For illustrative purposes, the handheld device 10A may be a smart phone, such as any iPhone® model available from Apple Inc.

As depicted, the handheld device 10A includes an enclosure 28 (e.g., housing). In some embodiments, the enclosure 28 may protect interior components from physical damage and/or shield them from electromagnetic interference. Additionally, as depicted, the enclosure 28 may surround the electronic display 12. In the depicted embodiment, the electronic display 12 is displaying a graphical user interface (GUI) 30 having an array of icons 32. By way of example, when an icon 32 is selected either by an input device 14 or a touch-sensing component of the electronic display 12, an application program may launch.

Furthermore, as depicted, input devices 14 may be accessed through openings in the enclosure 28. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. As depicted, the I/O ports 16 may be accessed through openings in the enclosure 28. In some embodiments, the I/O ports 16 may include, for example, an audio jack to connect to external devices.

Figure 3:
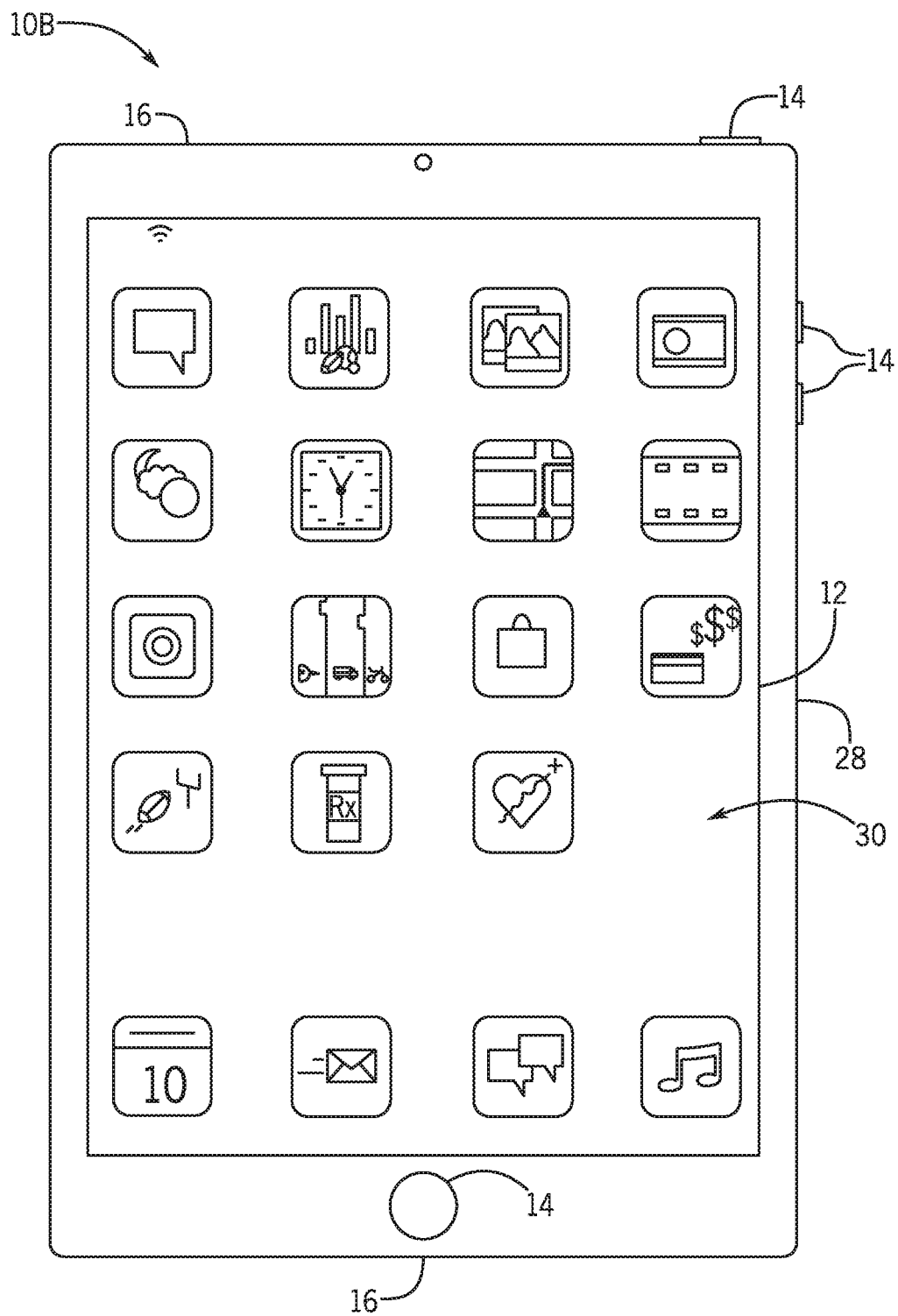
FIG. 3 is another example of the electronic device of FIG. 1, in accordance with an embodiment.
Figure 4:
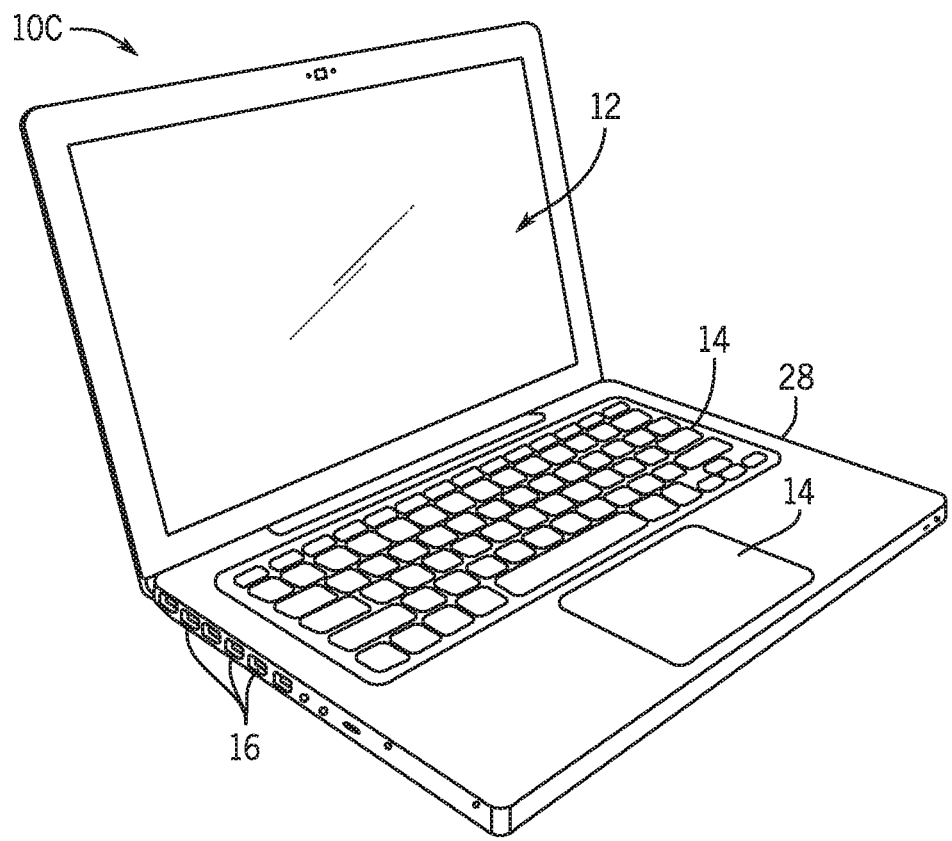
FIG. 4 is another example of the electronic device of FIG. 1, in accordance with an embodiment.
Figure 5:
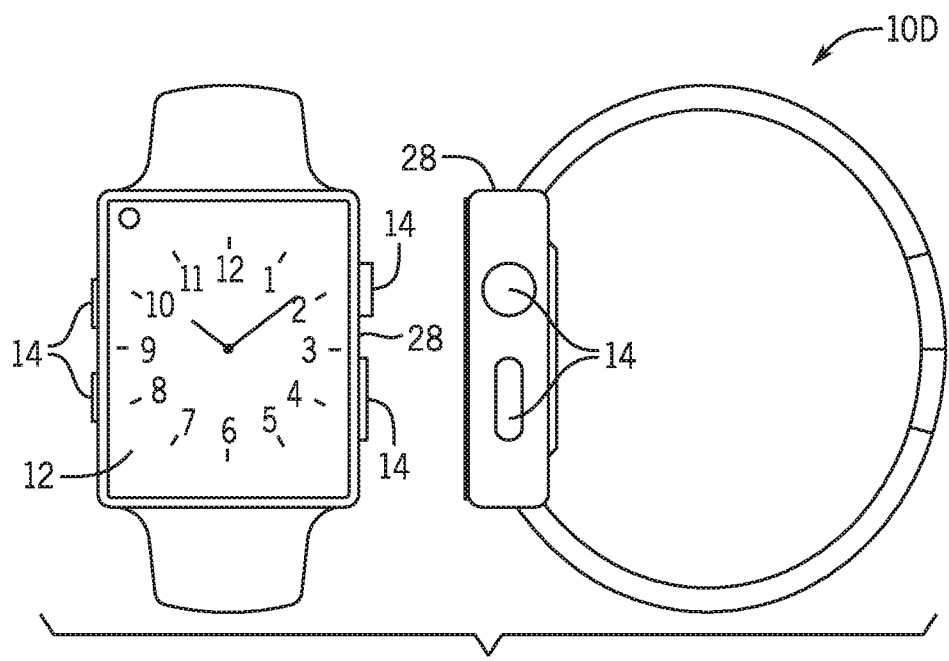
FIG. 5 is another example of the electronic device of FIG. 1, in accordance with an embodiment.

To further illustrate, another example of a suitable electronic device 10, specifically a tablet device 10B, is shown in FIG. 3. For illustrative purposes, the tablet device 10B may be any iPad® model available from Apple Inc. A further example of a suitable electronic device 10, specifically a computer 10C, is shown in FIG. 4. For illustrative purposes, the computer 10C may be any Macbook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, I/O ports 16, and an enclosure 28.

As described above, the electronic display 12 may display frames based on image data received, for example, from the processor core complex 18 and/or the image processing circuitry 27. To help illustrate, a portion 34 of the electronic device 10 including a display pipeline 36 that operationally retrieves, processes, and outputs image data is shown in FIG. 6. In some embodiments, a display pipeline 36 may analyze and/or process image data obtained from an image data source 38, for example, to determine a partial frame update from the image data to update a portion of the display pixels of the electronic display 12. Additionally, in some embodiments, a display driver 40 may generate and supply analog and/or digital electrical signals to the display pixels to display a frame based at least in part on image data received from the display pipeline 36.

In some embodiments, the display pipeline 36 and/or the display driver 40 may be implemented in the electronic device 10, the electronic display 12, or a combination thereof. For example, the display pipeline 36 may be included in the processor core complex 18, the image processing circuitry 27, a timing controller (TCON) in the electronic display 12, one or more other processing units or circuitry, or any combination thereof. Additionally, a controller 42 may be implemented to synchronize and/or supplement processing of the image data gathered from the image data source 38. For example, in some embodiments, the controller 42 may take the role of a TCON. The controller 42 may include a processor 44 and/or memory 46, and may be implemented as separate circuitry or integrated into other components. For example, as with the display pipeline 36, the controller 42 may be implemented in the electronic device 10, such as with the processor core complex 18, the image processing circuitry 27, with one or more other processing units or circuitry, or any combination thereof.

The controller 42 and/or the processor core complex 18 may assist in creating, rendering, and/or processing the image data before reaching the display pipeline 36. The image data may be stored in a source buffer 48 accessible to the display pipeline 36. In some embodiments, the source buffer 48 may be a part of the image data source 38 or integrated into the display pipeline 36. In some instances, an electronic device 10 may include one or more processing pipelines (e.g., display pipeline 36) implemented to process image data. To facilitate communication, image data may be stored in the image data source 38, external from the processing pipelines. In such instances, a processing pipeline, such as the display pipeline 36, may include a direct memory access (DMA) block that reads (e.g., retrieves) and/or writes (e.g., stores) image data in the image data source 38 (e.g., memory 46, main memory storage device 22, and/or local memory).

When retrieved (e.g., fetched) from the image data source 38 or source buffer 48 by the display pipeline 36, image data may be specified in a source space. The source space may include file formats and/or coding native to source of the image data. The display pipeline 36 may map the image data in the source space to the display space so that the image data may be output on the electronic display 12 via the display driver 40. Different types, models, sizes, and resolution electronic displays 12 may have different display spaces. The display space may be a space that is understood and displayable by an electronic display 12. Additionally, different electronic displays 12 and/or display drivers 40 may read data in a particular order. For example, an electronic display 12 may be arranged in a landscape orientation, however, the image data may still be updated to the screen in a portrait orientation. In such an example, the image data may be rotated in the display pipeline 36 to accommodate the screen orientation. In another example, a display pipeline 36 may flip or mirror the image data from a front facing camera such that the electronic display 12 shows an intuitively mirrored depiction of the camera feed. Furthermore, if, for example, an electronic display 12 has a different resolution, color format (e.g., red-green-blue (RGB), luminance-chrominance (a YCC format, such as YCbCr), etc.), or color palette than that of the image data, the display pipeline 36 may scale the image data and/or convert the color format and/or palette of the image data to accommodate the capabilities of the electronic display 12. As such, the mapping of image data from the source space to the display space may include rotation, scaling, mirroring, flipping, format changes, and/or other adaptations.

The display pipeline 36 may include a set of image data processing blocks 50 that perform such a mapping of the image data from the source space to the display space as well as various other image processing techniques. The image data processing blocks 50 may include, for example, a color management (CM) block 52, a blend block 54, a pixel contrast control (PCC) block 56, a dither block 58, and a crop block 60. In some embodiments, a display pipeline 36 may include more, less, combined, split, and/or reordered image data processing blocks 50.

The CM block 52 and blend block 54 may map colors, brightness, intensities, pixel positions, and/or other image characteristics from the source space to a display space, for example via rotation, scaling, mirroring, flipping, and/or other adaptations. Based on the characteristics of the display space and environmental factors, such as ambient lighting, the PCC block 56 may analyze the image data and apply tone maps. Such tone maps may alter the color and brightness levels of pixels based on image data characteristics and environmental factors. The PCC block 56 may also assist in aligning the image data on a "grid" for output to the display driver for proper viewing.

The dither block 58 may assist in smoothing and/or adjusting pixel colors and intensities globally or locally. These adjustments may assist in compensating for quantization error. For example, a display may not be able to achieve the full color palette or bit-depth of source image data. Instead of merely rounding or estimating to the nearest color, the dither block 58 may intertwine colors of the display's color palette amongst localized pixels to approximate the original image data and provide a more aesthetic, clear, and/or sharp output for viewing. As such, the dither block 58 may provide additional mapping of the image data to the bit-depth of the electronic display 12. Additionally or alternatively, the dither block 58 may also provide temporal dithering which may alternate colors and/or light intensities on different frames to yield an appearance of the desired color.

Before the image data of the frame is sent to the display driver 40, it may be processed through the crop block 60. The crop block may select the bounds and/or area of the frame to be displayed or updated on the electronic display 12. For example, if a partial frame update is processed, the crop block 60 may define which section of pixels are to be sent to the electronic display 12. The display driver 40 may make use of data lines and source lines to update the display. Receiving the pixels to be changed, the display driver 40 may update that section of the electronic display 12 while not re-driving and/or changing pixels that have not changed from the previous frame.

To help further illustrate, an example process 62 for operating a display pipeline 36 is described in FIG. 7. Generally, the process 62 includes retrieving source image data (process block 64) and processing the source image data to generate display image data (process block 66). The controller 42 and/or display pipeline 36 may also configure the electronic display to receive the display image data (process block 68). The display pipeline 36 may then output the display image data to the display driver 40 for viewing on the electronic display 12 (process block 70). As stated above, in some embodiments, the process may be hardware based, being implemented based on circuit connections formed in the display pipeline 36. Additionally or alternatively, the process may be implemented by executing instructions stored in a tangible non-transitory computer-readable medium, such as the controller memory 46, using processing circuitry, such as the controller processor 44.

In some embodiments, the controller 42 may instruct the display pipeline 36 to retrieve (e.g., fetch or read) source image data from an image data source 38 (process block 64). As described above, source image data may be stored in the source buffer 48. Thus, in some embodiments, the display pipeline 36 may retrieve source image data from the source buffer 48 via DMA. Once the image data is received into the display pipeline 36, the display pipeline 36 may commence and/or continue image processing.

Figure 8:
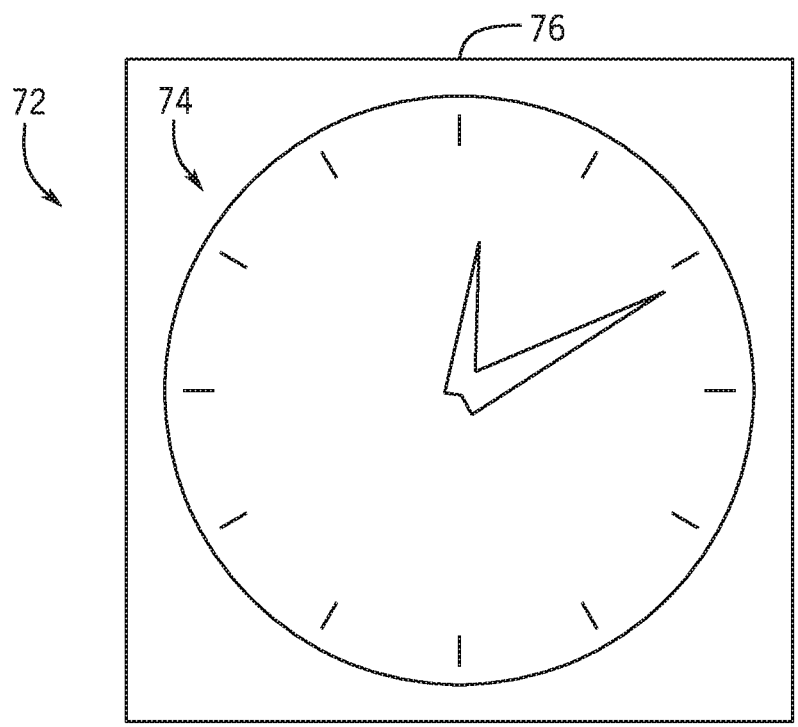
FIG. 8 is an example of a source image frame in a source space, in accordance with an embodiment.

To help illustrate, an example source image 72 is depicted in FIG. 8. The example source image 72 illustrates a clock 74 within the full source image boundary 76. It may be desirable to display such a source image on an electronic device 10 such as a mobile device, wearable device, or any suitable and desired device having an electronic display 12. As described above, images may be periodically updated to change the picture on the electronic display 12. As such, successive source image data may be retrieved by the display pipeline 36 to maintain the desired output to the electronic display 12. Each image may be successively processed and output at a desired moment in time. For example, a hand of the clock 74 may be moved in a subsequent frame to correspond with a passing minute in time.

Figure 9:
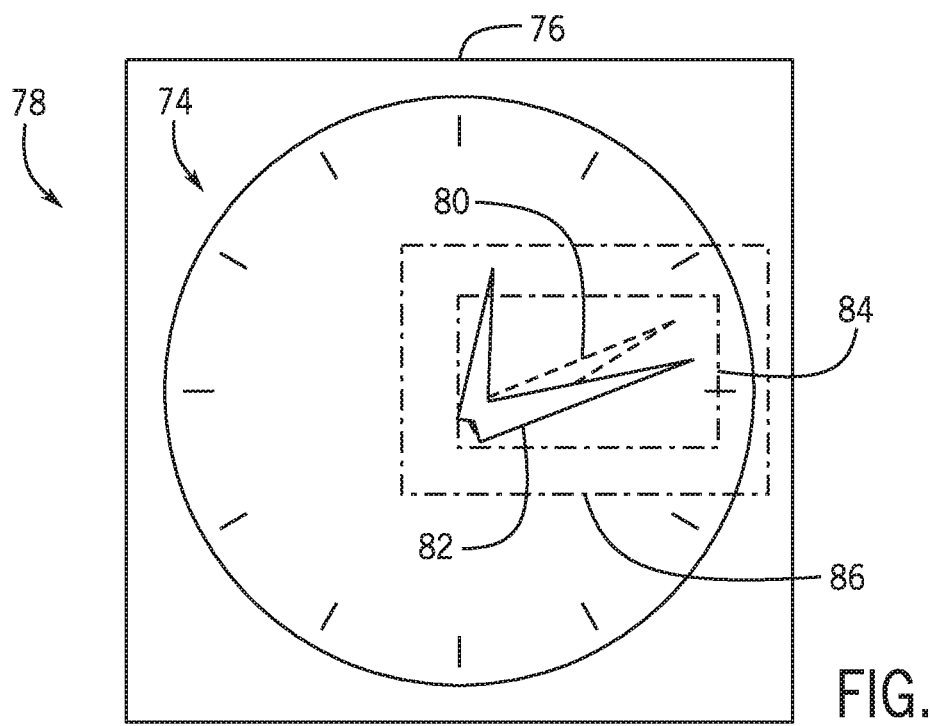
FIG. 9 is an example of another source image frame in the source space subsequent to the source image frame of FIG. 8, in accordance with an embodiment.

Illustrating this, an example of an updated source image 78 is depicted in FIG. 9. Although the majority of the image is the same, the current hand 80 is moved to a new position for the updated image as an updated hand 82. The region containing the change from the current hand 80 to the updated hand 82 is a differing region 84. To facilitate improving resource usage efficiency (e.g., reducing power draw), the display pipeline 36 may retrieve and process less than the full source image boundary 76.

As described above, the display pipeline 36 may processes source image data to determine and output display image data. In doing so, the display pipeline 36 may perform spatial processing (e.g., spatial-dithering). Thus, in order to process the differing region 84 effectively, the display pipeline 36 may fetch more than just the differing region 84. To encompass the differing region and nearby pixel areas for spatial and/or other image processing a partial scaling region 86 (e.g., fetch region) may be determined and retrieved (e.g., fetched) into the display pipeline 36.

Figure 10:
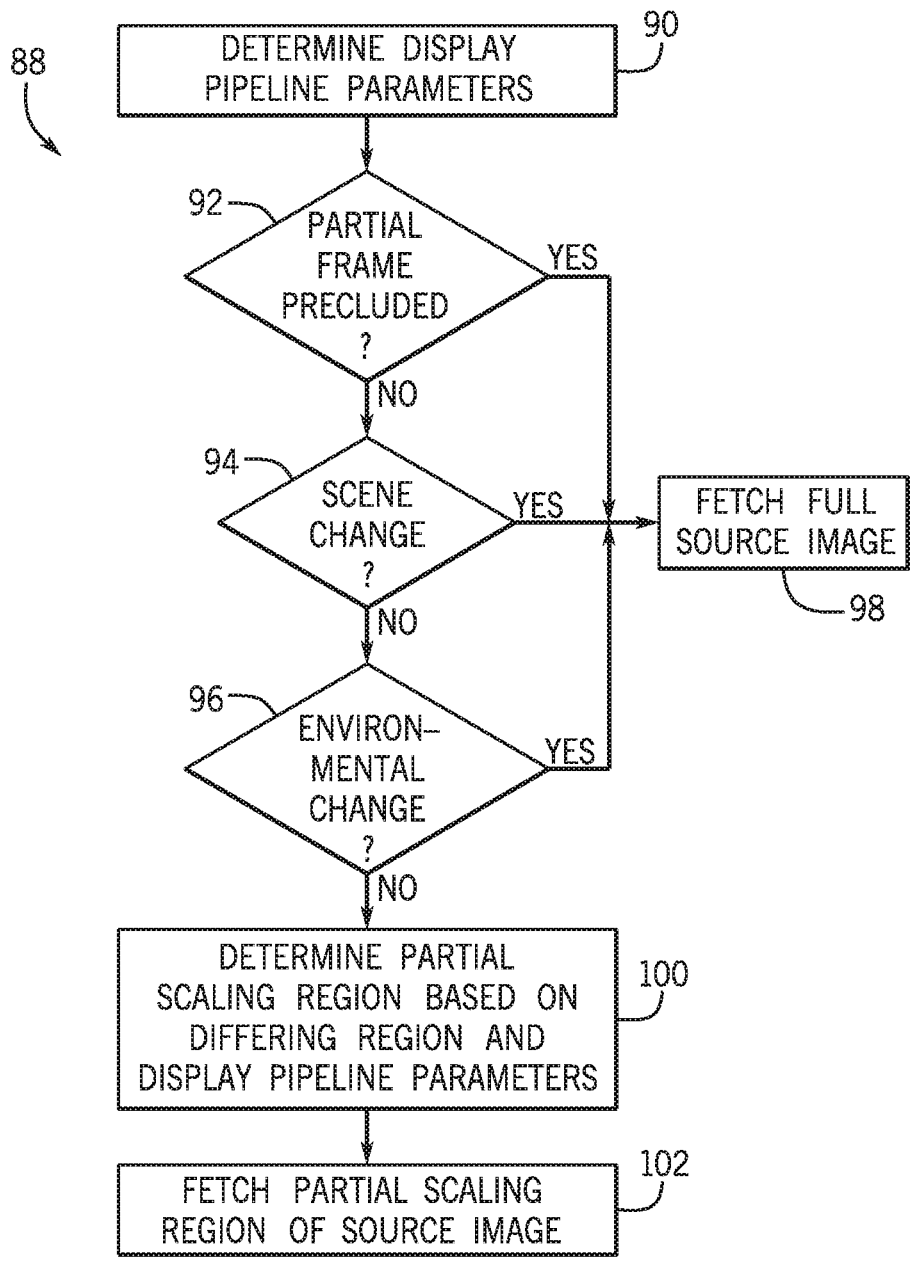
FIG. 10 is a flow diagram of a process for operating the display pipeline of FIG. 6 to fetch image data, in accordance with an embodiment.

The controller 42 may determine if a partial scaling region 86 or the full source image is to be fetched based on multiple factors exampled by flowchart 88 in FIG. 10. Parameters used by the display pipeline 36, such as the current state of the electronic display 12, the current state of the image data processing blocks 50, the current state of display pipeline registers (e.g., partial frame registers, PCC registers, dither registers, scaling registers, etc.), environmental factors, such as ambient lighting, and the currently displayed pixel color and intensity levels may first be determined (process block 90). The parameters of the display pipeline 36 along with the current and subsequent image data may be used to determine what region to fetch, for example, a full source image frame or a partial frame. If the partial frame update is precluded (decision block 92), a scene change is detected (decision block 94), or an environmental change is detected (decision block 96), then a full source image may be fetched (process block 98). However, if not, a partial scaling region 86 may then be determined based at least in part on the differing region 84 and display pipeline parameters (process block 100). This partial scaling region 86 may then be fetched from the image data source 38 (process block 102).

Figure 11:
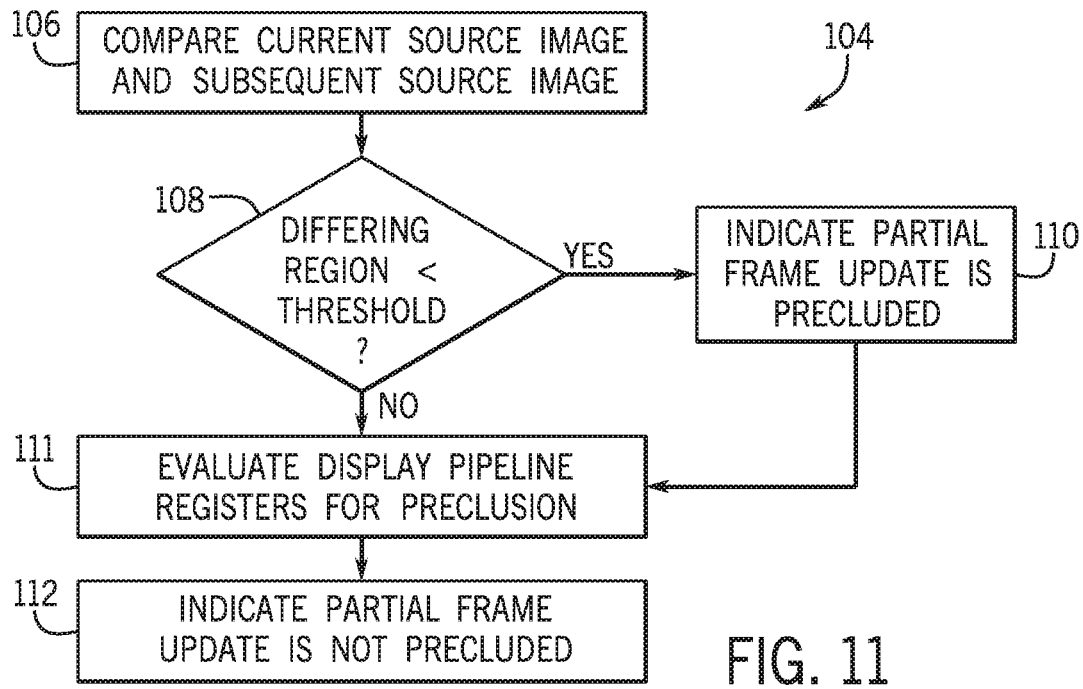
FIG. 11 is a flow diagram of a process for determining if partial frame update is precluded, in accordance with an embodiment.

FIG. 11 presents a flowchart 104 to better illustrate the determination of whether a partial frame is precluded. In determining preclusion, the controller 42 may compare the current source image and the subsequent source image (process block 106). Additionally, register and/or buffer values throughout the electronic device 10 may be referenced to check how much of the subsequent source image is different. If the difference between the current source image and the subsequent source image is greater than a threshold (decision block 108), partial frame update is precluded (process block 110).

In addition to the differing region threshold, the display pipeline registers may be evaluated for partial frame update preclusion (process block 111). As stated above, the display pipeline registers may express the state of the display pipeline 36. In some embodiments, if some display pipeline registers have changed from one frame to the next, more than the differing region may be changed upon output. As such, a full source image may be fetched. Additionally, some types of image processing may be incompatible with a partial frame update. If the display pipeline registers for such image processing techniques are enabled, a partial frame update may be precluded. However, if the differing region is less than a threshold and the display pipeline registers are suitable, a partial frame update is not precluded (process block 112).

In some embodiments a temporal event (e.g., a scene change) may lead to the fetching of a full image source. Additionally, if an environmental change occurs, such as an ambient lighting change, a modification to the global brightness might occur, also leading to a full source image fetch. Other factors may also be used to determine if a partial frame update is desirable depending on the electronic device 10 and its implementation. A partial frame register may track if a given frame may utilize partial frame update when processed. For example, a frame may initially qualify for a partial frame update, however, if, for example, frame scheduling is employed, for example due to APT being enabled, by the time the frame is processed, a partial frame update may no longer be desired. As such, the partial frame register may be updated based on the determination of factors such as those stated above.

Although stated above as a function of the controller 42, the determination of whether to fetch a full source image or a partial scaling region 86 as well as the determination of the differing region 84 and the corresponding partial scaling region 86 may be accomplished by the controller 42, the display pipeline 36, the display driver 40, the processor core complex 18, and/or other processing circuitry within the electronic device 10. The partial scaling region 86 may be communicated to the display pipeline 36, if not already internal, for retrieval, for example via DMA. The controller 42 and/or display pipeline 36 may also configure registers in the display pipeline 36 and/or the display driver 40 to receive either a full or partial frame update. The image data for the partial or full frame update may then be processed via the display pipeline 36 and output to the display driver 40.

When processing a partial scaling region 86, the display pipeline 36 may continue processing though the image data processing blocks 50. However, because the partial scaling region 86 retrieved from the image data source 38 does not include the entire image data set, the amount of image data to process may be considerably less. This may be beneficial by reducing the workload of the display pipeline 36 allowing the display pipeline 36 to consume less power and/or free up processing bandwidth for other tasks or frames.

As mentioned above, the display pipeline 36 may convert the image data from the source space to the display space when performing image processing. Furthermore, depending on the image processing to be done within the display pipeline 36, the partial scaling region 86 to be fetched by the display pipeline 36 may be larger than the differing region 84. As such, the differing region 84 may be used to determine one or more other partial regions in the display space before determining the partial scaling region 86 to be fetched.

Figure 12:
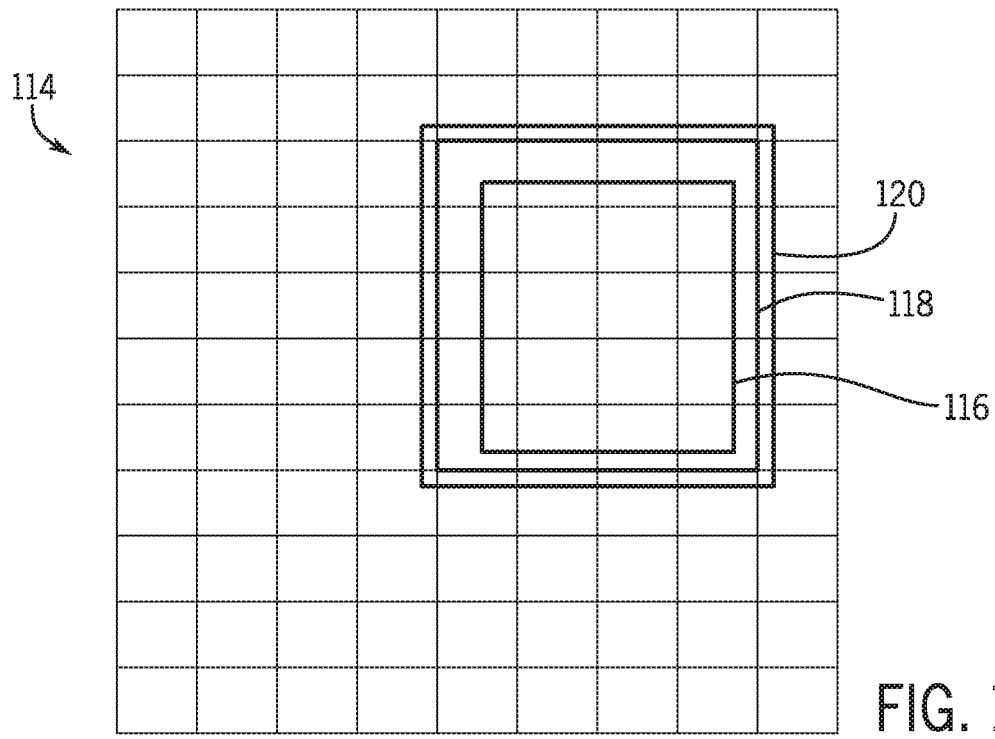
FIG. 12 is an example of a display image frame in a display space corresponding with the other source image frame of FIG. 9, in accordance with an embodiment.

To help illustrate the display space partial regions, FIG. 12 depicts a visual representation of a frame 114 in the display space. In one embodiment, the differing region 84 may be used to determine a crop region 116. The crop region 116 may include the display space pixels that are potentially impacted by the changes of the differing region 84. In other words, the crop region 116 may contain just the region of pixels that are to be transmitted to the electronic display 12. The crop region 116 may be determined by converting the differing region 84 from the source space to the display space. As mentioned above, this conversion, or mapping, transforms the offsets and dimensions of the source space to the display space. Such a conversion may include accounting for rotation, mirroring, height, width, offsets, scaling, and/or other mapping aspects. Additionally, based at least on the enabled image processing techniques, the crop region 116 may be expanded such that pixels that may be affected by the differing region 84 are included within the crop region 116.

Although the crop region 116 may encompass the area of pixels that may be changed, in some scenarios, which may depend on the desired image processing utilized in the display pipeline 36, the area around the changed pixels may be used in processing the changes. For example, a partial processing region 118 may be determined based on the crop region 116 to expand and align the partial region to a grid of the frame 114. Although the image data of a partial frame update may undergo similar processing as a full image data set, when mapping from the source space to the display space, for example in the CM block 52 and the blend block 54, the partial regions may not line up exactly with the grid of the display space. In some embodiments, some image processing techniques may rely on such a grid for proper function. For example, pixel statistics used during image processing may be determined based on blocks of pixels, for example, 32×32 pixel blocks or 64×64 pixel blocks. Therefore, the partial processing region 118 may expand the crop region 116 to be aligned with the grid. As such, the crop region 116 may be included completely within the partial processing region 118. In some embodiments however, for example if statistics gathering is disabled, the partial processing region 118 may be identical to the crop region 116.

Furthermore, a partial frame region 120 may be determined from the partial processing region 118 to account for spatial processing techniques, for example such as in the dither block 58, if so enabled. Indeed, the partial frame region 120 may be expanded beyond the partial processing region 118 to allow analysis of the pixel data that may affect pixels in the partial processing region 118 and/or the crop region 116. As such, the partial frame region 120 may include the image data to generate the changes to the frame 114. Additionally, the partial frame region 120 may include image data not output to the display driver 40, but may be used in calculations by the display pipeline 36. In some embodiments, multiple spatial processing or other image processing techniques may be utilized in the display pipeline 36 in sequence. In such a case, multiple partial frame regions 120 may be determined, each for the corresponding image processing step in the display pipeline 36. As such, each successive partial frame region 120 may wholly contain the previous partial regions as well as the partial processing region 118 and crop region 116. However, if no further processing is desired or enabled the partial frame region 120 may be identical to the partial processing region 118. The largest partial frame region 120, may include the full set of image data to be driven through the display pipeline 36.

From the largest partial frame region 120, if there is more than one, the partial scaling region 86 may be determined. The partial scaling region 86 may be determined by converting the partial frame region 120 back from the display space to the source space, for example by rotation, scaling, mirroring, flipping, and/or other mapping techniques. These mapping techniques may be the inverse of those used to determine the crop region 116 from the differing region 84. As described herein, the partial regions utilized in the display pipeline 36 may be determined before the partial scaling region 86 is fetched from memory. As such, once the image data of the partial scaling region 86 is fetched, each partial region may be utilized in the display pipeline 36 at the appropriate stage until the crop region 116 is output to the electronic display 12.

The partial frame region(s) 120 may be utilized for spatial processing of the image data, for example, in the dither block 58. Pixel statistics may be gathered on the image data in the partial processing region 118. The crop block 60 may polish the image processing by reducing the output to the display driver 40 to the crop region 116, which contains the changes from the current frame to the subsequent frame. In some embodiments, successive steps in the display pipeline 36 may use successive partial regions of equal or smaller size. This reduction in superfluously driven pixels of the electronic display 12 may further reduce consumption of power and/or bandwidth of the electronic display 12 and/or electronic device 10. Overall, the crop region 116 of the frame 114 may be sent to the display driver 40 to make the appropriate changes on the electronic display 12, while the rest of the frame 114 remains the same.

Figure 13:
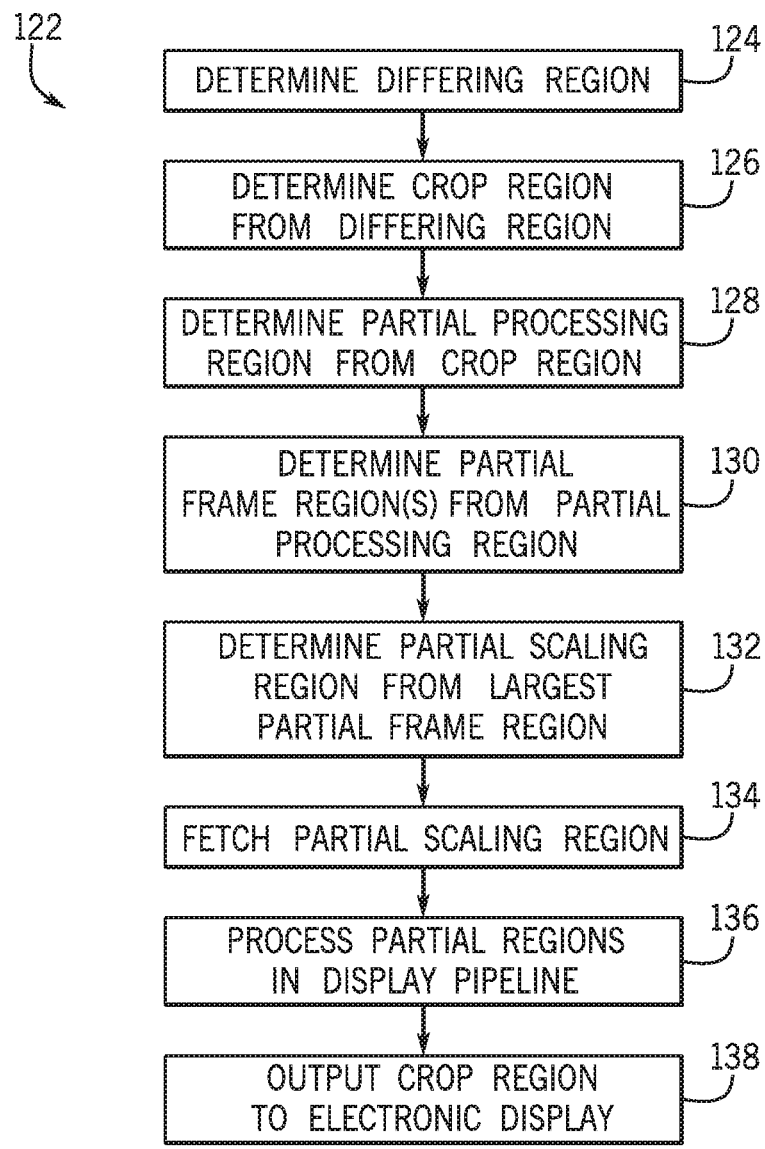
FIG. 13 is a flow diagram of a process for operating the display pipeline of FIG. 6 to fetch a partial scaling region, in accordance with an embodiment.

When a partial frame update is to be accomplished, the partial regions described above may be used at different points during image processing. The partial regions may be rectangular or any other suitable shape to accommodate processing. In one embodiment, the partial regions may be determined by the controller 42, display driver 40, and/or any suitable processor of the electronic device 10 before the image data is fetched, as depicted by flowchart 122 in FIG. 13.

The differing region 84 containing the source image data that has been modified since the previous frame may be determined (process block 124). The crop region 116 containing just the image data corresponding with the display pixels that may potentially be impacted by the pixels of the differing region 84 may be determined from the differing region 84 (process block 126). Because the crop region 116 is represented in the display space, the crop region 116 may be determined based at least in part on the mapping of the differing region 84 from the source space to the display space.

The partial processing region 118 may be determined from the crop region 116 (process block 128). The partial processing region 118 may contain image data for collecting pixel statistics in and around the crop region 116. From the partial processing region 118, the partial frame region 120 may be determined (process block 130). The partial frame region 120 may contain the image data to be pushed through and used for processing in the display pipeline 36. Additionally, in some embodiments, if multiple image processing techniques using the area around the changed pixels are utilized, for example multiple spatial processing techniques such as spatial dithering, there may be multiple partial frame regions 120 determined.

From the largest partial frame region 120, the partial scaling region 86 may be determined (process block 132). The partial scaling region 86 may contain the image data to be fetched from the image data source 38 or source buffer 48. Once the partial scaling region 86 has been determined, the corresponding image data within the partial scaling region 86 may be fetched (process block 134). The image data of the partial scaling region 86 may then be processed via the display pipeline 36 utilizing the partial regions (process block 136). For example, the CM block 52 and blend block 54 may map the image data of the partial scaling region 86 into the partial frame region 120, and pixel statistics may be gathered on the image data within the partial processing region 118. The crop block 60 may then crop the processed image data to the bounds of the crop region 116 and output the crop region 116 of image data to the electronic display 12, for example, via the display driver 40 (process block 138).

Although the partial regions discussed above are stated to be determined and processed in order, depending on implementation, more or fewer partial regions may be determined and/or processed in a different order. After processing however, during a partial frame update, the partial region of image data communicated to the electronic display 12 for updating may be smaller than a full frame update. Accordingly, by reducing the size of the updated frame to a partial region (e.g., partial scaling region 86), the electronic device 10 may reduce power consumption and free memory and/or processor bandwidth.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device comprising:
   a display panel comprising display pixels configured to display a current image frame based at least in part on display image data;
   image processing circuitry configured to:
   process source image data into the display image data fora frame update; and
   reduce an amount of the display image data to that of a crop region in response to the frame update comprising a partial frame update, wherein the crop region comprises all of the display image data to be changed in the frame update, wherein the crop region excludes at least a portion of the display image data that has not changed in the frame update, wherein a size and a position of the crop region is determined based, at least in part, on a differing region of the source image data; and
   one or more partial frame registers configured to track whether the partial frame update is to occur for the frame update, wherein the partial frame registers are configured to track whether the partial frame update is to occur based at least in part on whether an environmental change of ambient light over one or more image frames directly previous to the current image frame is detected.

2. The electronic device of claim 1, wherein the image processing circuitry is configured to fetch a partial scaling region of the source image data for processing by the image processing circuitry based at least in part on the crop region, wherein the partial scaling region is greater than or equal to the differing region, and wherein the partial scaling region does not encompass an entire frame.

3. The electronic device of claim 2, wherein the image processing circuitry is configured to:
   resolve the crop region by processing the source image data corresponding to the partial scaling region and populating the crop region with the display image data to be changed in the frame update; and
   output the display image data within the crop region to the display panel.

4. The electronic device of claim 1, wherein the differing region comprises a first portion of the source image data that has changed for the frame update and excludes a second portion of the source image data that has not changed for the frame update.

5. The electronic device of claim 1, wherein the frame update comprises a change from a previous image frame to the current image frame.

6. The electronic device of claim 1, wherein the partial frame registers are configured to track whether the partial frame update into occur during frame scheduling.

7. The electronic device of claim 1, wherein the partial frame registers are configured to track whether the partial frame update is to occur based at least in part on:
   a size of the differing region in the current image frame;
   whether a scene change is detected between the current image frame and a directly previous image frame; or
   a combination thereof.

8. The electronic device of claim 1, wherein the display panel is configured to:
   refresh a first portion of the display pixels based at least in part on the display image data within the crop region corresponding to the current image frame; and
   continue displaying the display image data of a directly previous image frame at a second portion of the display pixels outside the crop region.

9. The electronic device of claim 1, wherein the image processing circuitry is configured to determine the crop region by scaling the differing region based at least in part on a resolution of the display panel.

10. The electronic device of claim 1, wherein the electronic device comprises a portable phone, a media player, a personal data organizer, a handheld game platform, a tablet device, a computer, or any combination thereof.

11. An electronic device configured to perform a frame update on a display, the electronic device comprising:
   image processing circuitry configured to, in response to the frame update comprising a partial frame update, determine a crop region of image data, wherein the crop region comprises all of the image data that has changed from a previous frame, wherein the crop region excludes portions of the image data that have not changed from the previous frame, wherein a size and a position of the crop region is determined based, at least in part, on a differing region of the image data; and
   one or more partial frame registers configured to track whether the partial frame update is to occur for the frame update during frame scheduling, wherein the partial frame registers are configured to track whether the partial frame update is to occur based at least in part on whether an environmental change of ambient light over one or more image frames directly previous to a current image frame is detected.

12. The electronic device of claim 11, wherein the frame update comprises the partial frame update or an entire frame update, where the image processing circuitry is configured to perform the entire frame update and not the partial frame update if the partial frame update is restricted.

13. The electronic device of claim 12, wherein the partial frame update is restricted if an amount of the image data that has changed from the previous frame is greater than a threshold, a scene change is detected, a change to a global brightness into be implemented, or a combination thereof.

14. The electronic device of claim 11, wherein, during the partial frame update, the image processing circuitry is configured to fetch a partial scaling region and not an entire frame.

15. The electronic device of claim 14, wherein a size and position of the partial scaling region is determined based, at least in part, on the crop region.

16. The electronic device of claim 14, wherein the differing region is determined by the image processing circuitry prior to the partial scaling region being fetched.

17. A method for performing a partial frame update, the method comprising:
   determining if the partial frame update is desired, wherein the determination is based at least in part on one or more partial frame registers configured to track whether the partial frame update is to occur based at least in part on detection of an environmental change of ambient light over one or more image frames directly previous to a current image frame;
   determining, via image processing circuitry of an electronic device, a differing region, wherein the differing region comprises a first area of image data that has changed since a previous frame and excludes a second area of the image data that has not changed since the previous frame;
   determining, via the image processing circuitry, a size and a position of a crop region based, at least in part, on the differing region;
   determining, via the image processing circuitry, a size and a position of a partial scaling region based at least in part on the size and the position of the crop region, wherein the partial scaling region comprises all of the image data to be used by the image processing circuitry when processing the image data, wherein the partial scaling region does not encompass an entire frame;
   fetching a portion of the image data corresponding to the partial scaling region;
   resolving the crop region by processing the portion of the image data corresponding to the partial scaling region in the image processing circuitry and populating the crop region with processed image data such that the crop region comprises the first area of the image data that has changed since the previous frame and excludes at least a portion of the second area of the image data that has not changed since the previous frame; and
   outputting the processed image data within the crop region to be displayed on an electronic display.

18. The method of claim 17, wherein the differing region and the partial scaling region exist in a source space and the crop region is determined based, at least in part, by mapping the differing region into a display space.

19. The method of claim 17, comprising determining, via the image processing circuitry, sizes and positions of one or more partial regions based, at least in part, on the size and the position of the crop region, wherein the one or more partial regions exist in a display space, wherein the one or more partial regions each comprise a section of the image data, wherein the section of the image data of each of the one or more partial regions corresponds to the image data needed for an image processing technique.

20. The method of claim 17, wherein determining if the partial frame update is desired further comprises:
   determining if the partial frame update is precluded, wherein the partial frame update is precluded if greater than a threshold amount of the image data has changed since the previous frame or if a set of display pipeline registers specifies an unsuitability for performing the partial frame update;

determining if a temporal event has occurred, wherein the temporal event comprises a scene change; or
a combination thereof.

\* \* \* \* \*